US010100875B2

(12) United States Patent
Nonato de Paula

(10) Patent No.: US 10,100,875 B2
(45) Date of Patent: Oct. 16, 2018

(54) ROLLER BEARING AND SYSTEMS INCLUDING SUCH

(71) Applicant: General Electric Company, Schenectady, NY (US)

(72) Inventor: Fabio Nonato de Paula, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/219,978

(22) Filed: Jul. 26, 2016

(65) Prior Publication Data

US 2018/0031038 A1 Feb. 1, 2018

(51) Int. Cl.
*F16C 33/36* (2006.01)
*F16C 19/28* (2006.01)
*F16H 1/28* (2006.01)
*F16H 57/08* (2006.01)

(52) U.S. Cl.
CPC .............. *F16C 33/36* (2013.01); *F16C 19/28* (2013.01); *F16H 1/28* (2013.01); *F16C 2361/61* (2013.01); *F16H 2057/085* (2013.01)

(58) Field of Classification Search
CPC .......... F16C 19/24; F16C 19/26; F16C 33/34; F16C 33/36; F16C 2361/61; F16C 19/28; F16H 2057/085
See application file for complete search history.

(56) References Cited

U.S. PATENT DOCUMENTS

| | | | |
|---|---|---|---|
| 4,557,613 | A | 12/1985 | Tallian et al. |
| 4,705,411 | A | 11/1987 | Kellstrom |
| 5,286,117 | A | 2/1994 | Wojan et al. |
| 5,310,269 | A | 5/1994 | Wardle et al. |
| 6,227,711 | B1 | 5/2001 | Kellstroem et al. |

(Continued)

FOREIGN PATENT DOCUMENTS

| | | |
|---|---|---|
| DE | 102012216438 A1 | 4/2014 |
| EP | 2803436 A2 | 11/2014 |

(Continued)

OTHER PUBLICATIONS

Translation of JP4429841 obtained Oct. 13, 2017.*

(Continued)

*Primary Examiner* — James Pilkington
(74) *Attorney, Agent, or Firm* — GE Global Patent Operation; John P. Darling

(57) ABSTRACT

A bearing includes an inner raceway and an outer raceway extending about a rotational axis. The outer raceway is spaced radially from the inner raceway such that an annular cavity is defined between the inner raceway and the outer raceway. The bearing also includes a plurality of first rollers disposed in the annular cavity. Each first roller of the plurality of first rollers includes a first end, a second end spaced axially from the first end, and a first surface extending between the first end and the second end. A first profile drop extends between the first end and the first surface. A second profile drop extends between the second end and the first surface. The second profile drop differs from the first profile drop. The bearing further includes a plurality of second rollers disposed in the annular cavity and spaced axially from the plurality of first rollers.

20 Claims, 4 Drawing Sheets

(56) References Cited

U.S. PATENT DOCUMENTS

| | | | |
|---|---|---|---|
| 6,547,443 B2 * | 4/2003 | Hanai | F16C 19/225 384/450 |
| 8,123,413 B2 | 2/2012 | Tambe et al. | |
| 8,172,717 B2 | 5/2012 | Lopez et al. | |
| 8,198,744 B2 | 6/2012 | Kern et al. | |
| 8,235,861 B2 | 8/2012 | Lopez et al. | |
| 8,287,423 B2 | 10/2012 | Lopez et al. | |
| 8,298,114 B2 | 10/2012 | Lopez et al. | |
| 8,459,872 B2 | 6/2013 | Nies et al. | |
| 8,491,435 B2 | 7/2013 | Ghanime et al. | |
| 8,506,446 B2 | 8/2013 | Minadeo et al. | |
| 8,517,672 B2 | 8/2013 | McCooey | |
| 8,550,955 B2 | 10/2013 | Erno et al. | |
| 8,550,957 B2 | 10/2013 | Erno et al. | |
| 8,657,714 B1 | 2/2014 | Ghanime et al. | |
| 8,696,314 B2 | 4/2014 | Mashue et al. | |
| 8,727,629 B2 | 5/2014 | Do et al. | |
| 8,727,632 B2 | 5/2014 | Do et al. | |
| 8,777,802 B2 | 7/2014 | Erno et al. | |
| 8,857,192 B2 | 10/2014 | Huang et al. | |
| 8,904,746 B2 | 12/2014 | Fang et al. | |
| 2005/0148425 A1 * | 7/2005 | Nakagawa | F16C 19/28 475/348 |
| 2016/0138648 A1 | 5/2016 | Kellstrom et al. | |

FOREIGN PATENT DOCUMENTS

| | | | |
|---|---|---|---|
| JP | 2007155063 A | | 6/2007 |
| JP | 4429841 | * | 12/2009 |
| WO | 2015162623 A2 | | 10/2015 |

OTHER PUBLICATIONS

Goodelle et al., "EA Practical Method for Determining Contact Stresses in Elastically Loaded Line Contacts", A S L E Transactions, vol. 13, Issue: 4, pp. 269-277, 1970.

Tae-Jo Park, "Effect of Roller Profile and Misalignment in EHL of Finite Line Contacts", Advanced Materials and Tribology, ASME 2010 10th Biennial Conference on Engineering Systems Design and Analysis, vol. 1, pp. 395-401, 2010, Istanbul, Turkey.

* cited by examiner

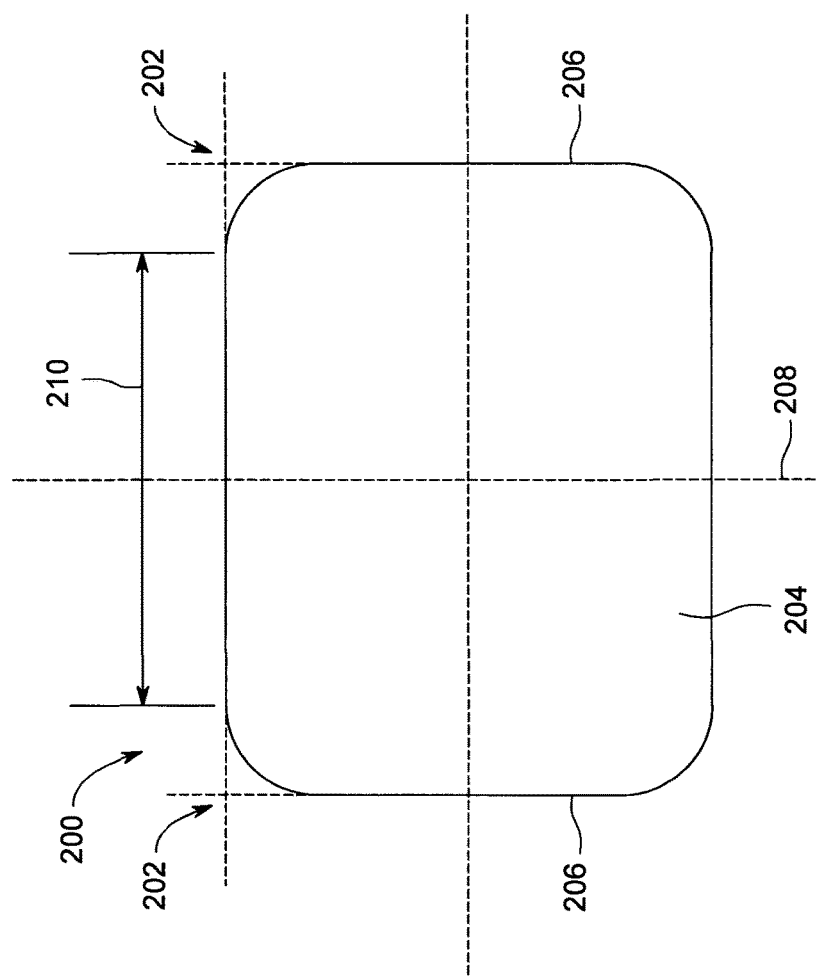

ROLLER BEARING AND SYSTEMS INCLUDING SUCH

BACKGROUND

The field of the invention relates generally to bearings, and more particularly, to bearings including rollers.

Bearings are used in rotary machines for supporting a rotating piece, e.g., a rotor. At least some bearings include rows of rollers within an annular cavity. Typically, the annular cavity is defined between an inner raceway and an outer raceway. Sometimes, the inner raceway and the outer raceway are misaligned and the edges of the rollers experience increased contact pressure which results in increased stress concentrations. Accordingly, at least some known rollers include a profile drop on each edge of the roller to reduce stress concentrations at the edges. However, the profile drops decrease the surface area that receives radial loads. As a result, the profile drops decrease the radial load capacity of the rollers.

BRIEF DESCRIPTION

In one aspect, a bearing is provided. The bearing includes an inner raceway and an outer raceway extending about a rotational axis. The outer raceway is spaced radially from the inner raceway such that an annular cavity is defined between the inner raceway and the outer raceway. The bearing also includes a plurality of first rollers disposed in the annular cavity. Each first roller of the plurality of first rollers includes a first end and a second end spaced axially from the first end. Each first roller also includes a first surface extending between the first end and the second end. A first profile drop extends between the first end and the first surface. A second profile drop extends between the second end and the first surface. The second profile drop differs from the first profile drop. The bearing further includes a plurality of second rollers disposed in the annular cavity and spaced axially from the plurality of first rollers.

In another aspect, a gear system is provided. The gear system includes a first gear configured to rotate about a rotational axis and a first bearing configured to support the first gear. The first bearing includes an inner raceway and an outer raceway extending about a rotational axis. The outer raceway is spaced radially from the inner raceway such that an annular cavity is defined between the inner raceway and the outer raceway. The first bearing also includes a plurality of first rollers disposed in the annular cavity. Each first roller of the plurality of first rollers includes a first end, a second end spaced axially from the first end, and a first surface extending between the first end and the second end. A first profile drop extends between the first end and the first surface. A second profile drop extends between the second end and the first surface. The second profile drop differs from the first profile drop.

In another aspect, a rotary machine is provided. The rotary machine includes a rotor and a drive component coupled to the rotor. The drive component is configured to induce rotation of the rotor. The rotary machine also includes a bearing configured to support the rotor. The bearing includes an inner raceway and an outer raceway extending about a rotational axis. The outer raceway is spaced radially from the inner raceway such that an annular cavity is defined between the inner raceway and the outer raceway. The bearing also includes a plurality of first rollers disposed in the annular cavity. Each first roller of the plurality of first rollers includes a first end, a second end spaced axially from the first end, and a first surface extending between the first end and the second end. A first profile drop extends between the first end and the first surface. A second profile drop extends between the second end and the first surface. The second profile drop differs from the first profile drop.

DRAWINGS

These and other features, aspects, and advantages of the present disclosure will become better understood when the following detailed description is read with reference to the accompanying drawings in which like characters represent like parts throughout the drawings, wherein:

FIG. 4 is a schematic view of an inner roller for the bearing shown in FIG. 2.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations that extend substantially parallel to an axis of the rotary machine or bearing. Moreover, the terms "radial" and "radially" refer to directions and orientations that extend substantially perpendicular to the axis of the rotary machine or bearing. In addition, as used herein, the terms "circumferential" and "circumferentially" refer to directions and orientations that extend arcuately about the axis of the rotary machine or bearing.

The bearings described herein include rollers positioned within an annular cavity and arranged in a plurality of rows. The rollers include different profile drops adjacent opposite ends of the rollers. In other words, the rollers are asymmetric. In some embodiments, the profile drop adjacent an outer end of the roller is larger than the profile drop adjacent an inner end of the roller. As a result, the larger profile drop reduces stress concentrations in the rollers due to moment loads and misalignment loads. The smaller profile drop provides an increased bearing surface to facilitate the rollers supporting a greater radial load.

Figure 1:
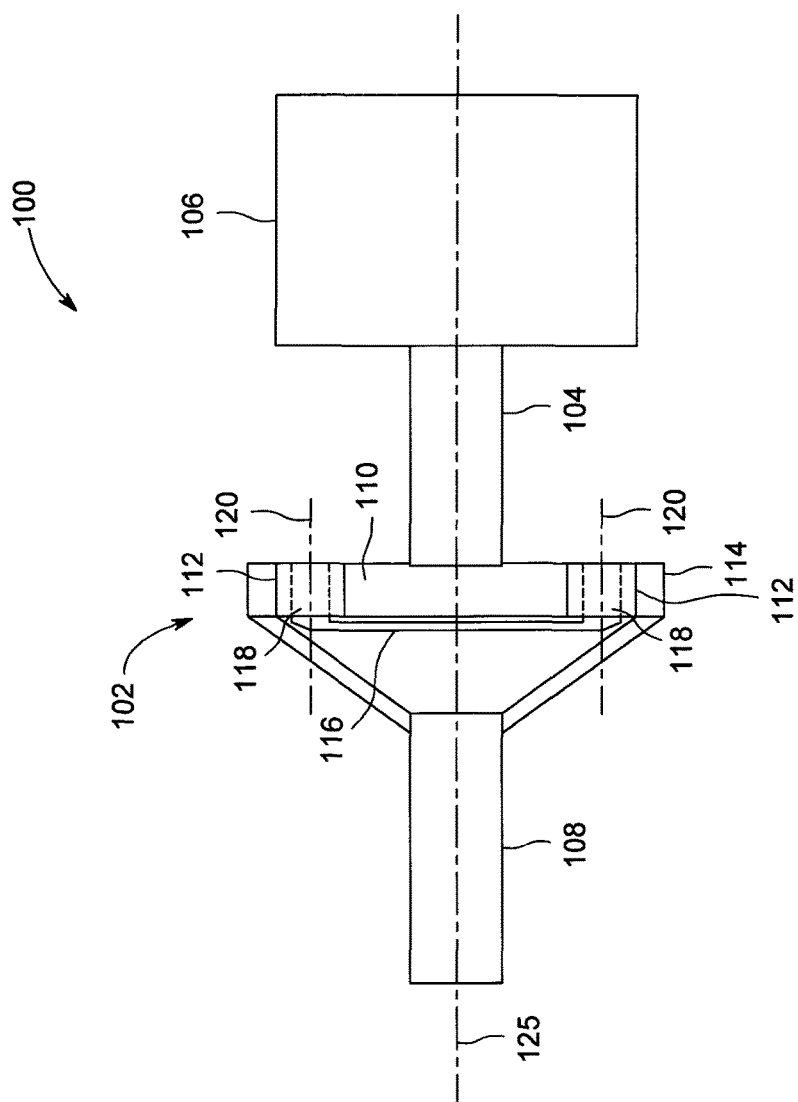
FIG. 1 is a schematic view of an exemplary rotary machine.

FIG. 1 is a schematic view of an exemplary rotary machine 100. In the exemplary embodiment, rotary machine 100 includes a gear system 102, an input rotor 104, a drive component 106, and an output rotor 108. Drive component 106 is coupled to input rotor 104 and configured to induce rotation of input rotor 104. Gear system 102 is coupled between input rotor 104 and output rotor 108 such that gear system 102 induces rotation of output rotor 108 when input rotor 104 rotates. In alternative embodiments, rotary machine 100 is any rotary machine. For example, in some embodiments, rotary machine 100 is any of the following, without limitation: a compressor, a blower, a pump, a turbine, a motor, and a generator.

In the exemplary embodiment, gear system 102 includes a sun or central gear 110, planetary gears 112, a ring gear 114, a carrier 116, and bearings 118. Planetary gears 112 are positioned circumferentially about central gear 110. Each planetary gear 112 rotates about an axis 120 and about central gear 110. Accordingly, in the exemplary embodiment, gear system 102 is an epicyclic or planetary gear system. In alternative embodiments, rotary machine 100 includes any gear system 102 that enables rotary machine to operate as described herein.

In addition, in the exemplary embodiment, central gear 110 is coupled to input rotor 104 such that rotation of input rotor 104 induces rotation of central gear 110. Planetary gears 112 are engaged with central gear 110 such that rotation of central gear 110 induces rotation of planetary gears 112. Ring gear 114 extends about central gear 110 and planetary gears 112. Ring gear 114 engages each of planetary gears 112. Accordingly, rotation of planetary gears 112 induces rotation of ring gear 114. In addition, ring gear 114 is coupled to output rotor 108 such that rotation of ring gear 114 induces rotation of output rotor 108. In the illustrated embodiment, ring gear 114 is substantially annular. In alternative embodiments, gear system 102 includes any ring gear 114 that enables gear system 102 to function as described herein.

Also, in the exemplary embodiment, gear system 102 includes four planetary gears 112 spaced equidistant about central gear 110. In alternative embodiments, gear system 102 includes any gears that enable gear system 102 to operate as described herein. For example, in some embodiments, gear system 102 includes three planetary gears 112. In further embodiments, gear system 102 includes five or more planetary gears 112.

As shown in FIG. 1, in the exemplary embodiment, planetary gears 112 are supported by bearings 118, which are coupled to carrier 116. Bearings 118 facilitate each planetary gear 112 rotating about axis 120. Moreover, planetary gears 112 are coupled to bearings 118 and carrier 116 such that planetary gears 112 rotate about central gear 110. In alternative embodiments, rotary machine 100 includes any bearings 118 that enable rotary machine 100 to operate as described herein. For example, in some embodiments, rotary machine 100 includes bearings 118 that support central gear 110, ring gear 114, input rotor 104, and/or output rotor 108.

Figure 2:
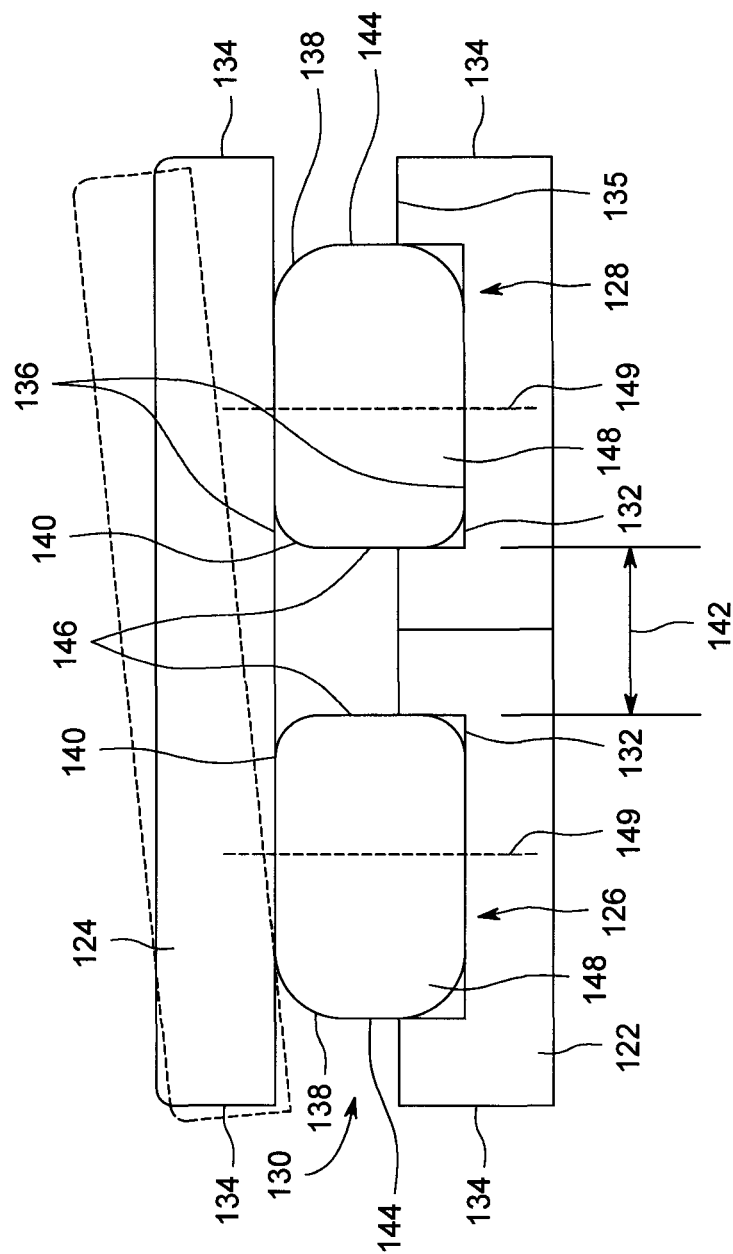
FIG. 2 is a schematic view of a portion of a bearing of the rotary machine shown in FIG. 1.

FIG. 2 is a schematic view of a portion of bearing 118 of rotary machine 100. Bearing 118 includes an inner raceway 122, an outer raceway 124, first rollers 126, and second rollers 128. Inner raceway 122 and outer raceway 124 extend about a rotational axis 125 (shown in FIG. 1) and are spaced radially apart. Accordingly, inner raceway 122 and outer raceway 124 define an annular cavity 130 therebetween. First rollers 126 and second rollers 128 are positioned in annular cavity 130 between inner raceway 122 and outer raceway 124. Inner raceway 122 includes a plurality of grooves 132 that receive first rollers 126 and second rollers 128. In alternative embodiments, bearing 118 includes any raceways 122, 124 that enable bearing 118 to function as described herein. For example, in some embodiments, outer raceway 124 includes grooves 132. In further embodiments, outer raceway 124 and/or inner raceway 122 include curved surfaces and/or profile drops.

Moreover, in the exemplary embodiment, inner raceway 122 and outer raceway 124 include edges 134. A surface 135 of inner raceway 122 extends between edges 134 of inner raceway 122. A surface 136 of outer raceway 124 extends between edges 134 of outer raceway 124 and is opposite surface 135 of inner raceway 122. Surface 136 of outer raceway 124 is substantially parallel to surface 135 of inner raceway 122 when inner raceway 122 and outer raceway 124 are aligned, as shown with solid lines in FIG. 2. When inner raceway 122 and outer raceway 124 are misaligned, surface 136 of outer raceway 124 is angled in relation to surface 135 of inner raceway 122, as shown with broken lines in FIG. 2. Moreover, edges 134 of inner raceway 122 and outer raceway 124 are parallel when inner raceway 122 and outer raceway 124 are aligned and are angled relative to each other when inner raceway 122 and outer raceway 124 are misaligned.

Misalignment of inner raceway 122 and outer raceway 124 results in misalignment loading on and stress concentrations in first rollers 126 and/or second rollers 128 adjacent edges 134. For example, when outer raceway 124 tilts in relation to inner raceway 122 as shown in FIG. 2, the contact pressure between surface 136 and a first profile drop 138 of first roller 126 is increased and the contact pressure between surface 136 and a second profile drop 140 is decreased. As described in more detail below, first profile drop 138 differs from second profile drop 140 and accommodates the increased contact pressure. As a result, first profile drop 138 reduces the sensitivity of first rollers 126 and second rollers 128 to misalignment of inner raceway 122 and outer raceway 124. Moreover, second profile drop 140 facilitates first rollers 126 and second rollers 128 having a greater radial load capacity.

In the exemplary embodiment, first rollers 126 are arranged in a row in groove 132. Second rollers 128 are arranged in a row in groove 132 and are spaced axially a distance 142 from first rollers 126. First rollers 126 and second rollers 128 contact inner raceway 122 and outer raceway 124 such that a radial load is transferred through first rollers 126 and second rollers 128. In the exemplary embodiment, first roller 126 and second roller 128 are substantially similar. As shown in FIG. 2, first roller 126 and second roller 128 face opposite directions. In particular, first roller 126 and second roller 128 are positioned such that first ends 144 face outward and first profile drops 138 are adjacent edges 134. In alternative embodiments, bearing 118 includes any roller 126, 128 that enables bearing 118 to operate as described herein. For example, in some embodiments, bearing 118 includes first rollers 126 that are different from second rollers 128. In further embodiments, bearing 118 includes three or more rows of rollers. In some embodiments, rollers in inner row(s) are symmetric and have equal profile drops adjacent each end.

Figure 3:
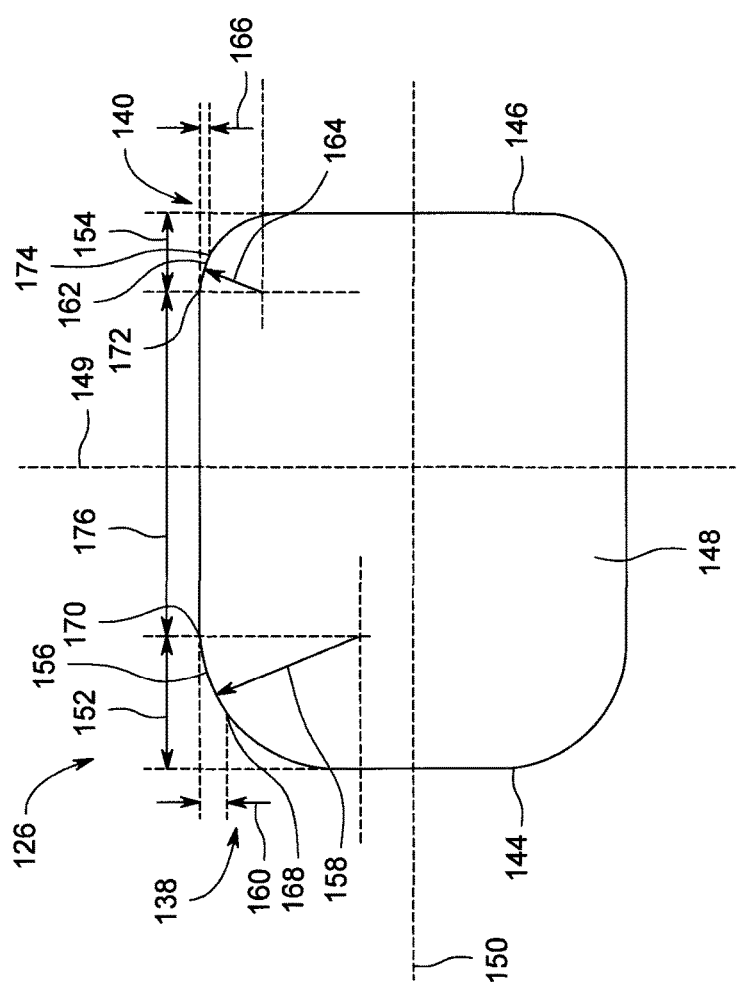
FIG. 3 is a schematic view of a roller of the bearing shown in FIG. 2.

FIG. 3 is a schematic view of first roller 126 of bearing 118 (shown in FIG. 2). First roller 126 includes first profile drop 138, second profile drop 140, a first end 144, a second end 146, and a surface 148. First end 144 and second end 146 are spaced axially apart. Surface 148 extends between first end 144 and second end 146. Surface 148 extends annularly about an axis 150. In the illustrated embodiment, surface 148, first end 144, and second end 146 form a cylinder. First roller 126 is asymmetric about a plane 149 extending through a longitudinal midpoint of first roller 126 because first profile drop 138 differs from second profile drop 140. In alternative embodiments, first roller 126 has any shape that enables bearing 118 (shown in FIG. 2) to operate as described herein.

In the exemplary embodiment, first profile drop 138 extends from first end 144 to surface 148. In particular, first profile drop 138 extends a first distance 152 from first end 144. Second profile drop 140 extends from second end 146 to surface 148. Second profile drop 140 extends a second distance 154 from second end 146. First distance 152 is greater than second distance 154, i.e., first profile drop 138 is greater than second profile drop 140. In some embodiments, a ratio of first distance 152 to second distance 154 is in a range from about 1 to about 25. In further embodiments, a ratio of first distance 152 to second distance 154 is in a range from about 1.5 to about 10. In alternative embodiments, first profile drop 138 and second profile drop 140 extend any distances that enable bearing 118 (shown in FIG. 2) to operate as described herein.

In addition, in the exemplary embodiment, first profile drop 138 includes a curve 156 having a first radius 158 and a first drop 160. Second profile drop 140 includes a curve 162 having a second radius 164 and a second drop 166. In reference to the orientation shown in FIG. 3, first drop 160 is the vertical distance between a first gage point 168 and a flat point 170. Second drop 166 is the vertical distance between a second gage point 172 and a second flat point 174. In the exemplary embodiment, first drop 160 is greater than second drop 166. In some embodiments, a ratio of first drop 160 to second drop 166 is in a range from about 1 to about 25. In further embodiments, a ratio of first drop 160 to second drop 166 is in a range from about 1.5 to about 10.

In alternative embodiments, first roller 126 includes any profile drop that enables first roller 126 to function as described herein. For example, in some embodiments, at least one of first profile drop 138 and second profile drop 140 includes a curve with a varying radius. In further embodiments, at least one of first profile drop 138 and second profile drop 140 includes a logarithmic curve. In some embodiments, first roller 126 includes a plurality of first profile drops 138 extending between first end 144 and surface 148. For example, in some embodiments, first roller 126 includes a relatively small first profile drop that transitions to a larger first profile drop.

Moreover, in the exemplary embodiment, first profile drop 138 is blended into first end 144 and surface 148 such that first profile drop 138, first end 144, and surface 148 form a continuous surface. In addition, second profile drop 140 is blended into second end 146 and surface 148 such that second profile drop 140, second end 146, and surface 148 form a continuous surface. As a result, stress concentrations in first profile drop 138 and second profile drop 140 are reduced. In alternative embodiments, first roller 126 includes any transitions, such as fillets and/or chamfers, that enable first roller 126 to function as described herein.

Also, in the exemplary embodiment, surface 148 has a width 176 defined between first profile drop 138 and second profile drop 140. Width 176 at least partially determines the radial load capacity of first roller 126. Increasing first profile drop 138 and/or second profile drop 140 decreases width 176 and, thereby, decreases the radial load capacity of first roller 126. Accordingly, requirements for radial load, moment load, and misalignment load are balanced by adjusting width 176, first profile drop 138, and second profile drop 140. For example, first profile drop 138 is configured to accommodate a greater contact pressure between surface 136 and first profile drop 138 that occurs when outer raceway 124 (shown in FIG. 2) is tilted. In contrast, second profile drop 140 is configured to accommodate a greater radial loading.

FIG. 4 is a schematic view of an inner roller 200 for bearing 118 (shown in FIG. 2). In some embodiments, a plurality of inner rollers 200 are positioned in a row between first rollers 126 (shown in FIG. 2) and second rollers 128 (shown in FIG. 2). Inner roller 200 includes profile drops 202, a surface 204, and ends 206. Inner roller 200 has equal profile drops 202 adjacent opposite ends 206 because inner roller 200 does not experience increased contact pressure when outer raceway 124 and inner raceway 122 are misaligned. As a result, inner roller 200 is symmetric about a plane 208 extending through a longitudinal midpoint of inner roller 200. Moreover, a width 210 of surface 204 is greater than width 176 (shown in FIG. 3) because profile drops 202 are less than first profile drops 138 (shown in FIG. 3). As a result, profile drops 202 facilitate inner roller 200 having an increased radial load capacity. In the exemplary embodiment, length 176 is formed by a cylinder portion of inner roller 200 having a flat surface. In alternative embodiments, bearing 118 (shown in FIG. 2) includes any inner roller 200 that enables bearing 118 (shown in FIG. 2) to operate as described herein. For example, in some embodiments, inner roller 200 includes a crown and/or any other profile that enables inner roller 200 to function as described herein.

In reference to FIGS. 2-4, a method of assembling bearing 118 includes coupling inner raceway 122 to outer raceway 124 such that annular cavity 130 is defined therebetween. The method also includes positioning first rollers 126 and second rollers 128 in annular cavity 130. First rollers 126 and second rollers 128 are positioned in rows in grooves 132. In some embodiments, inner rollers 200 are positioned between first rollers 126 and second rollers 128. The method further includes positioning first rollers 126 and second rollers 128 such that first profile drops 138 are adjacent edges 134. In some embodiments, first profile drops 138 are greater than second profile drops 140.

The above-described rotary machines include rollers positioned within an annular cavity and arranged in a plurality of rows. The rollers include different profile drops adjacent opposite ends of the rollers. In other words, the rollers are asymmetric. In some embodiments, the profile drop adjacent an outer end of the roller is larger than the profile drop adjacent an inner end of the roller. As a result, the larger profile drop reduces stress concentrations in the rollers due to moment loads and misalignment loads. The smaller profile drop provides an increased bearing surface to facilitate the rollers supporting a greater radial load.

An exemplary technical effect of the methods, systems, and apparatus described herein includes at least one of: (a) reducing the magnitude of stress concentration in rollers; (b)

increasing the radial load capacity of rollers; and (c) decreasing the sensitivity of roller bearings to misalignment and moment loads.

Exemplary embodiments of a rotary machine and methods of operating a rotary machine are described above in detail. The system and methods described herein are not limited to the specific embodiments described, but rather, components of systems and/or steps of the methods may be utilized independently and separately from other components and/or steps described herein. For example, the methods may also be used in combination with other rotary machines, and are not limited to practice with only the systems and methods, as is described herein. Rather, the exemplary embodiments can be implemented and utilized in connection with many other applications, equipment, and systems that may benefit from the advantages described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing comprising:
   an inner raceway extending about a rotational axis;
   an outer raceway extending about the rotational axis, said outer raceway spaced radially from said inner raceway such that an annular cavity is defined between said inner raceway and said outer raceway;
   a plurality of first rollers disposed in the annular cavity; and
   a plurality of second rollers disposed in the annular cavity and spaced axially from said plurality of first rollers, each of the first rollers and each of the second rollers including
     a first end adjacent an outer edge of the outer raceway and a second end spaced axially inward from the first end,
     a surface extending between the first end and the second end;
     a first profile drop extending between the first end and the surface;
     a second profile drop extending between the second end and the surface, wherein the first profile drop extends a first axial distance from the first end and the second profile drop extends a second axial distance from the second end, and a ratio of the first axial distance to the second axial distance is in a range from 1.5 to 25.

2. The bearing in accordance with claim 1, wherein at least one of the first profile drop or the second profile drop includes a varying radius.

3. The bearing in accordance with claim 1, wherein the ratio of the first axial distance to said second axial distance is in a range from 1.5 to 10.

4. The bearing in accordance with claim 1, wherein each first drop extends a first radial distance from the surface and each second drop extends a second radial distance from the surface, and a ratio of the first radial distance to the second radial distance is in a range of from 1.5 to 25.

5. The bearing in accordance with claim 4, wherein the ratio of the first radial distance to the second radial distance is in a range of from 1.5 to 10.

6. The bearing in accordance with claim 4, wherein the first end, the first profile drop, and the surface form a continuous surface.

7. The bearing in accordance with claim 6, wherein the second end, the second profile drop, and the surface form a continuous surface.

8. A gear system comprising:
   a gear configured to rotate about a rotational axis; and
   a bearing according to claim 7 configured to support the gear.

9. A rotary machine comprising:
   a rotor;
   a drive component coupled to said rotor and configured to induce rotation of said rotor; and
   a gear system according to claim 8 configured to support said rotor.

10. A rotary machine comprising:
    a rotor;
    a drive component coupled to said rotor and configured to induce rotation of said rotor; and
    a bearing according to claim 7 configured to support said rotor.

11. A rotary machine comprising:
    a rotor;
    drive component coupled to said rotor and configured to induce rotation of said rotor; and
    a bearing according to claim 4 configured to support said rotor.

12. A gear system comprising:
    a first gear configured to rotate about a rotational axis; and
    a first bearing according to claim 1 configured to support said first gear.

13. The gear system in accordance with claim 12 further comprising a central gear, a ring gear, a second gear, and a third gear, said first gear, said second gear, and said third gear engaging said central gear and said ring gear to form a planetary gear system.

14. The gear system in accordance with claim 13 further comprising a second bearing configured to support said second gear and a third bearing configured to support said third gear.

15. The gear system in accordance with claim 14 further comprising a carrier coupled to said first bearing, said second bearing, and said third bearing, wherein said carrier is configured to facilitate said first gear, said second gear, and said third gear rotating about said central gear.

16. A rotary machine comprising:
    a rotor;
    a drive component coupled to said rotor and configured to induce rotation of said rotor; and
    a gear system according to claim 15 configured to support said rotor.

17. A rotary machine comprising:
    a rotor;
    a drive component coupled to said rotor and configured to induce rotation of said rotor; and
    a gear system according to claim 14 configured to support said rotor.

18. A rotary machine comprising:
a rotor;
a drive component coupled to said rotor and configured to induce rotation of said rotor; and
a gear system according to claim 13 configured to support said rotor.

19. A rotary machine comprising:
a rotor;
a drive component coupled to said rotor and configured to induce rotation of said rotor; and
a gear system according to claim 12 configured to support said rotor.

20. A rotary machine comprising:
a rotor;
a drive component coupled to said rotor and configured to induce rotation of said rotor; and
a bearing according to claim 1 configured to support said rotor.

* * * * *